(12) United States Patent
Kellogg et al.

(10) Patent No.: US 8,649,486 B1
(45) Date of Patent: Feb. 11, 2014

(54) METHOD FOR PROVIDING TEXT MESSAGING CONFIRMATION

(75) Inventors: William Kellogg, Austin, TX (US);
Andrew Ofisher, Chicago, IL (US);
Timothy Perry, Aurora, IL (US);
Robert Overman, Naperville, IL (US);
Scott Woodard, Clarendon Hills, IL (US)

(73) Assignee: ShowingTime, Chicago, IL (US)

( * ) Notice: Subject to any disclaimer, the term of this patent is extended or adjusted under 35 U.S.C. 154(b) by 108 days.

(21) Appl. No.: 13/492,816

(22) Filed: Jun. 9, 2012

(51) Int. Cl.
*H04M 11/00* (2006.01)

(52) U.S. Cl.
USPC ...................................... 379/93.01; 705/7.12

(58) Field of Classification Search
USPC ............... 379/93.01; 705/7.12, 313
See application file for complete search history.

(56) References Cited

U.S. PATENT DOCUMENTS

| | | | |
|---|---|---|---|
| 5,280,518 A | 1/1994 | Danler et al. | |
| 5,475,375 A | 12/1995 | Barrett et al. | |
| 5,612,683 A | 3/1997 | Trempala et al. | |
| 5,705,991 A | 1/1998 | Kniffin et al. | |
| 5,974,406 A | 10/1999 | Bisdikian et al. | |
| 6,101,480 A | 8/2000 | Conmy et al. | |
| 6,157,315 A | 12/2000 | Kokubo et al. | |
| 6,300,873 B1 | 10/2001 | Kucharczyk et al. | |
| 6,385,541 B1 | 5/2002 | Blumberg | |
| 6,594,633 B1 | 7/2003 | Broerman | |
| 6,624,742 B1 | 9/2003 | Romano et al. | |
| 6,727,801 B1 | 4/2004 | Gervasi et al. | |
| 6,973,432 B1 | 12/2005 | Woodard et al. | |
| 7,009,489 B2 | 3/2006 | Fisher | |
| 7,193,503 B2 | 3/2007 | Fisher | |
| 8,035,480 B2 | 10/2011 | Woodard et al. | |
| RE43,068 E | 1/2012 | Woodard et al. | |
| 8,145,352 B2 | 3/2012 | Woodard et al. | |
| 2003/0154573 A1 | 8/2003 | Gould | |
| 2003/0179075 A1 | 9/2003 | Greenman | |
| 2006/0220809 A1 | 10/2006 | Stigall et al. | |
| 2007/0290798 A1 | 12/2007 | Larson et al. | |

*Primary Examiner* — Creighton Smith
(74) *Attorney, Agent, or Firm* — The Law Offices of Konrad Sherinian, LLC

(57) ABSTRACT

A method for providing confirmation of a request for a target communicated using text messaging includes receiving, by a sending system, a request for a target. The method further includes selecting, by the sending system, a telephone number from a list of telephone numbers, wherein a mapping is created between the request, the selected telephone number, the target, and a target contact. Additionally, the method includes sending, by the sending system to the target contact using the selected telephone number, a text message indicating the request for the target. Moreover, the method includes receiving a reply message from the target contact using the selected telephone number, and determining that the reply message comprises a reply to the request for the target by comparing the target contact and the selected telephone number for the reply message to the mapping.

23 Claims, 6 Drawing Sheets

US 8,649,486 B1

METHOD FOR PROVIDING TEXT MESSAGING CONFIRMATION

FIELD OF THE DISCLOSURE

The present disclosure relates generally to text messaging and, in particular, to a method for providing text messaging confirmation.

BACKGROUND

Text messaging technologies, such as the widely used Short Message Service (SMS), enable exchange of brief text messages between communication devices. For example, smartphones generally have the capability to exchange SMS messages with another mobile telephone, a portable device, or a fixed system. Text messaging is widely used for both private and commercial purposes. For instance, text messaging is used to deliver digital content, such as notifications, requests, news alerts, financial information, etc.

In commercial settings, text messaging is often used by a sending system to send text messages to multiple smartphones or other types of portable devices. Additionally, the text messages often have different content and need to be responded to with reply text messages. For example, a real estate showing appointment scheduling system sends, to real estate property listing agents or real estate property owners, text messages requesting confirmation of showing appointment requests. The showing appointments generally differ in real estate property, showing appointment time, and/or showing appointment requestor. A recipient of a text message pertaining to a showing appointment request (also referred to herein as a showing appointment request text message or a request text message) responds to the request contained within the text message by sending a reply text message to the real estate showing appointment scheduling system.

A reply text message from a smartphone usually indicates two text messaging numbers (e.g., telephone numbers)—one for the replier and one for the sender of the request text message (i.e., the text message for which the reply text message is intended). However, the reply text message from the smartphone does not include the content of the request text message. In the absence of such content, the sending system of the request test message cannot uniquely match the reply text message to the request text message, and thereby cannot automatically confirm showing appointment requests, where the sending system sends out multiple text messages using the same text messaging number.

Accordingly, there is a need for a method for providing text messaging confirmation such that reply text messages are matched to request text messages.

BRIEF DESCRIPTION OF THE DRAWINGS

The accompanying figures, where like reference numerals refer to identical or functionally similar elements throughout the separate views, together with the detailed description below, are incorporated and form part of the specification and serve to further illustrate various embodiments of concepts that include the claimed invention, and to explain various principles and advantages of those embodiments.

Figure 1:
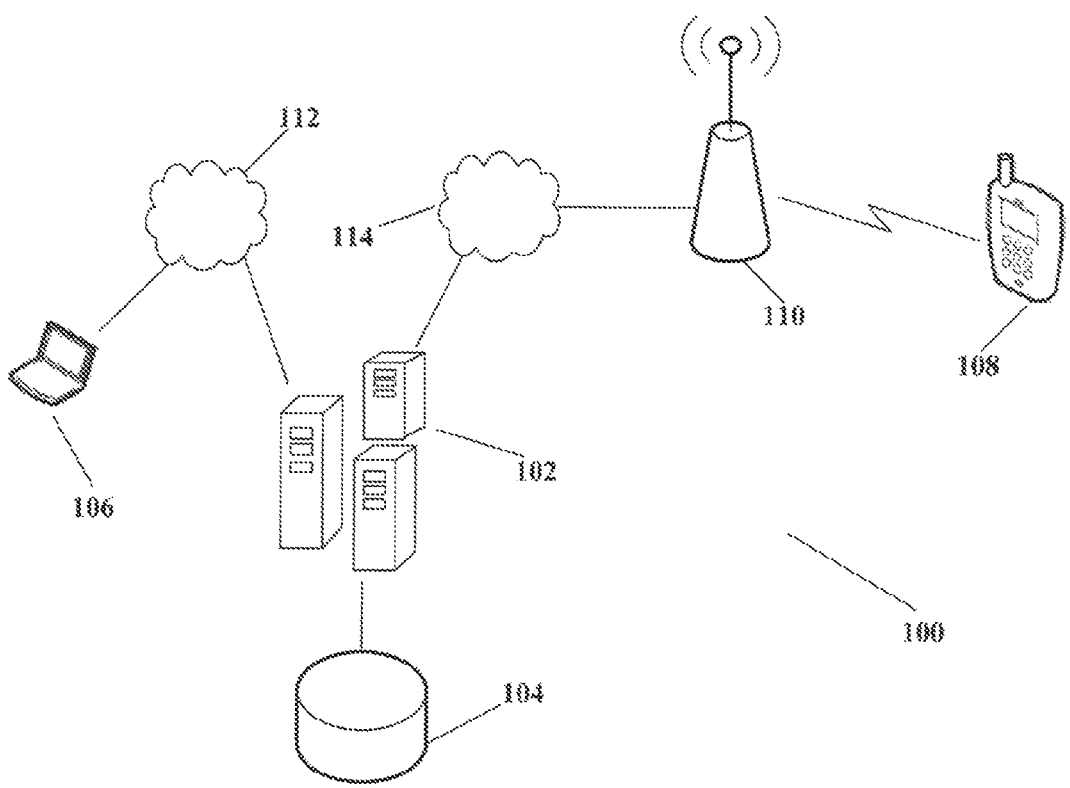
FIG. 1 illustrates a block diagram of a communication system having a text message sending system implementing some embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Moreover, the content of certain messages (e.g., text messages, e-mails, telephone calls, etc.) may be expressed in particular words and/or phrases while those skilled in the art will understand that such specificity with respect to expression is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a method for providing confirmation of a request for a target communicated using text messaging. In accordance with the present teachings, a method includes receiving, by a sending system, a request for a target. The method further includes selecting, by the sending system, a telephone number from a list of telephone numbers, wherein a mapping is created between the request, the selected telephone number, the target, and a target contact. Additionally, the method includes sending, by the sending system to the target contact using the selected telephone number, a text message indicating the request for the target. Moreover, the method includes receiving a reply message from the target contact using the selected telephone number, and determining that the reply message comprises a reply to the request for the target by comparing the target contact and the selected telephone number for the reply message to the mapping.

Further in accordance with the present teachings is a method for providing confirmation of a showing request communicated using text messaging. The method includes receiving, by a real estate showing appointment scheduling system, a showing request for a real estate listing. The method further includes determining, by the real estate showing appointment scheduling system, a listing contact for the real estate listing.

Additionally, the method includes selecting, by the real estate showing appointment scheduling system, a text messaging number from a list of text messaging numbers, wherein a mapping is created between the showing request, the selected text messaging number, the real estate listing, and the listing contact. Moreover, the method includes sending, by the real estate showing appointment scheduling system to the listing contact using the selected text messaging number, a text message indicating the showing request. Furthermore, the method includes receiving a reply message from the listing contact using the selected text messaging number, and comparing the listing contact and the selected text messaging number for the reply message to the mapping to match the reply message to the showing request for the real estate listing.

Referring now to the drawings, and in particular FIG. 1, an illustrative communication system having a text messaging sending system implementing embodiments in accordance with the present teachings is shown and indicated generally at 100. In one illustrative embodiment, system 100 comprises a real estate showing appointment scheduling system (also interchangeably referred to herein as a sending system, a scheduling system, or a real estate showing management system) 102, a real estate showing appointment database 104, two communication devices 106 and 108, two wired networks 112 and 114, and a wireless network 110 (wherein, in an embodiment, one or more of the networks 110, 112, or 114 is or includes a telephone network). Only a limited number of system elements 102 to 114 are shown for ease of illustration; but additional such elements may be included in the system 100. Moreover, other components needed for a commercial embodiment of the system 100 are omitted from the drawing for clarity in describing the enclosed embodiments.

The scheduling system 102 is configured to perform methods in accordance with the present teachings to provide text messaging confirmation, such as methods illustrated and described below by reference to FIGS. 2-6. The scheduling system 102 comprises one or more servers (not shown) that host real estate showing appointment scheduling and management applications, such as ShowingTime®'s ShowingDesk™ software or ShowingTime®'s Appointment Service™. A showing appointment scheduling application may be physically housed in a single server or distributed across multiple servers within the scheduling system 102. Moreover, the scheduling system 102 integrates with or connects to one or more listing services (not shown) to update a database 104 of real estate property listings.

Showing agents, listing agents, and property owners (all considered listing contacts for purposes of the present teachings) access the scheduling system 102 using communication devices, such as communication devices 106 and 108. The device 106 connects to the scheduling system 102 over a network (wired or wireless) 112, while the device 108 connects to the scheduling system 102 over a wireless network (such as a public cellular network) 110 and a network 114 (wired or wireless). The devices 106 and 108 can be any type of communication device such as mobile phones, smartphones, mobile data terminals, Personal Digital Assistants (PDAs), laptops, etc. In a particular embodiment of the system 100, the device 106 is laptop running ShowingDesk™ client software and connecting to the scheduling system 102 over an Internet connection, while the device 108 is a smartphone receiving from and sending to the scheduling system 102 text messages concerning showing appointments.

In general, as used herein, the communication devices 106 and 108 and components of the scheduling system 102 or their hardware being "configured" or "adapted" means that such elements are implemented using one or more (although not shown) memory devices, network interfaces, and/or processing devices that are operatively coupled, and which, when programmed, form the means for these system elements to implement their desired functionality, for example, as illustrated by reference to the methods shown in FIGS. 2-6. The network interfaces are used for passing signaling also referred to herein as messaging (e.g., messages, packets, datagrams, frames, superframes, and the like) containing control information, voice or non-voice media (e.g., text) between the elements of the system 100. The implementation of the network interface in any particular element depends on the particular type of network, i.e., wired and/or wireless, to which the element is connected.

Where the network supports wireless communications, the network interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware. Examples of wireless interfaces include IEEE 802.11, Fourth Generation (4G) cellular interfaces, etc.

The processing devices utilized by the elements of system 100 may be partially implemented in hardware and, thereby, programmed with software or firmware logic or code for performing functionality described by reference to FIGS. 2-6; and/or the processing devices may be completely implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

Figure 2:
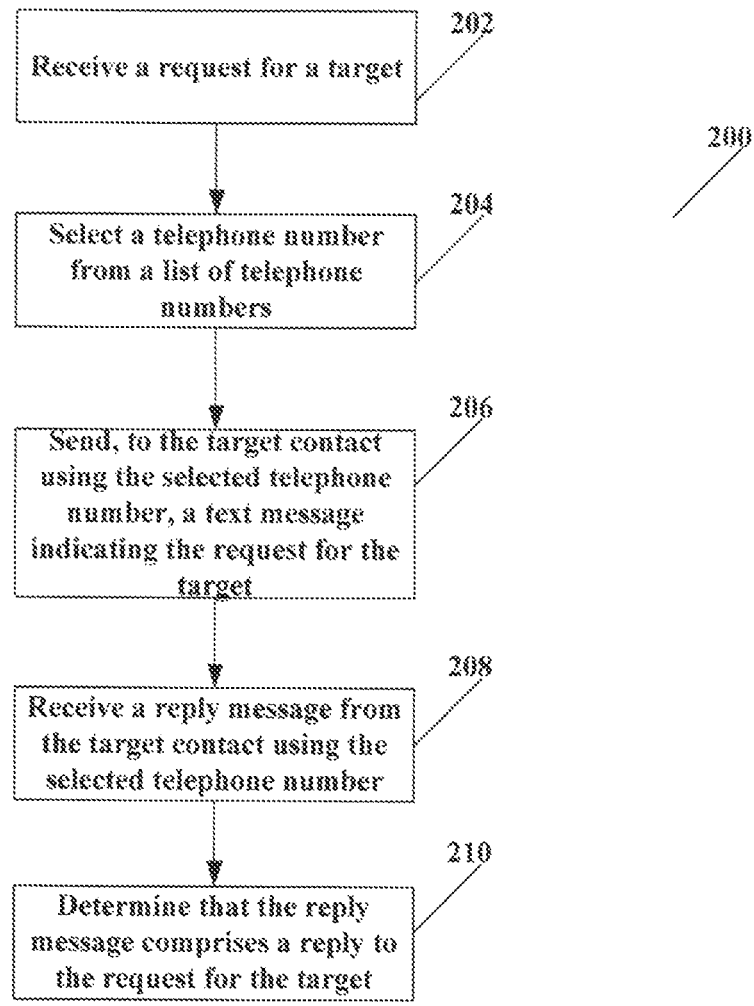
FIG. 2 is a logical flowchart illustrating a method for providing text messaging confirmation in accordance with some embodiments.

We now turn to a detailed description of the functionality of the system 100 elements in accordance with the teachings herein and by reference to the remaining figures. FIG. 2 illustrates a logical flow diagram showing a general method 200 performed by a sending system (such as the scheduling system 102) for providing text messaging confirmation. The scheduling system 102 manages and processes real estate property listings (also referred to herein simply as listings) stored in the database 104. A listing is a real estate property that has been put up for sale, for instance by a property owner. In the scheduling system 102 and database 104, a listing is a logical representation of a real estate property, and often comprises identification and contact information (such as a mobile telephone number and an e-mail address) of the owner and one or more listing agents of the underlying real estate property. As mentioned above, the listing agents, showing agents and owners are also collectively referred to herein as listing contacts. Listing contacts of a listing may include other interested parties, such as a listing office of the listing, a tenant of the underlying real estate property, a bank, or a mortgage company. Additionally, a listing includes a detailed description, such as an address and features, of the underlying real estate property.

The scheduling system 102 also manages showings of listings. A showing of a listing is a scheduled visit of the underlying real estate by a showing agent (such as a real estate agent for a prospective buyer), the prospect buyer or another party (e.g., a professional inspector). A showing request (also referred to herein as a showing appointment request, a request for a showing, or a request for a showing appointment) is a request that concerns or is regarding the showing of a real estate listing. To schedule a showing, a showing agent, for instance, accesses (e.g., using the device 106) the scheduling system 102 to request a showing appointment on a selected listing. The showing appointment is made on the calendar of a listing contact (such as a listing, which is a real estate agent for the seller). Listing contacts access (e.g., using the device 106) the scheduling system 102 to manage their calendars. For example, a listing agent marks some time slots where he accepts showing appointments and indicates some other time slots where he does not accept showing appointments. For each showing appointment request made by a showing agent, the scheduling system 102 oftentimes notifies (through e-mail, telephone, text messaging, etc.) the listing contact for confirmation of the showing appointment request. Responsive to the listing contact's acceptance or decline of the showing appointment request, the scheduling system 102 notifies (through e-mail, telephone, text messaging, etc.) the showing agent of the listing contact's confirmation or decline.

The scheduling system 102 further provides for other functionalities. For example, the scheduling system 102 allows showing agents, listing agents, and owners to specify and modify their profiles, notification preference, etc. In another example, a listing agent accesses the scheduling system 102 to edit his listings' showing information. Profiles, preferences, listings, calendars of the listing contacts, and showing appointments are stored in the database 104.

Turning now to FIG. 2 and the particulars of a method 200, performed by a sending system comprising any suitable system infrastructure having text message sending and reply message receiving capabilities, for providing text message confirmation in accordance with an embodiment of the present teachings. At 202, a sending system receives a request for a target. In this illustrative embodiment, the scheduling system 102 is the sending system, the request is a request for a showing appointment, the target is a listing, and a target contact is a listing contact. Accordingly, it can be said that, in the illustrative embodiment, receiving the request for the target comprises receiving a showing request for a real estate listing.

In one example implementation, a showing agent, using the device 106, accesses the calendar of a listing contact (e.g., the owner or listing agent) of the selected listing and selects a time slot, in order to request a showing appointment. Alternatively, the request can be any other type of request, such as a request for a conversation or for acceptance of a sales lead (also interchangeably referred to herein as buyer lead), while the target can be a listing contact or any other interested party.

For instance in one alternate embodiment, the target is a showing agent, while the request seeks or offers a different time (meaning different day or different time on a same day) for a given showing appointment. For example, due to personal reasons, the home owner of a real estate listing needs to have possession of his property during the requested time for a showing and intends to reschedule the showing. Accordingly, the home owner sends, to the showing agent of the showing, a text message seeking or proposing a different time for the showing appointment. In this case, the request for the target (i.e., the showing agent) comprises an offer or a request for a different time for a showing of a real estate listing.

In another alternate embodiment, the target is a showing agent, and the request inquires about the status of his showing, such as whether the showing agent (for a given showing appointment) has finished his showing of a real estate listing. For instance, at or shortly after the end time of the given showing appointment, the scheduling system 102 sends the showing agent a text message requesting for status (e.g., done or done in fifteen minutes) of the showing appointment. Where the showing agent has completed his showing, the scheduling system then notifies listing contacts of completion of the showing. For example, after a showing has been completed, homeowners or tenants of the underlying listing of the showing are notified by the scheduling system that their property is ready for access. Accordingly, it can be said that, in this alternate embodiment, the request for the target comprises an inquiry for a status of a showing of a real estate listing.

In yet another alternate embodiment, a buyer lead for a real estate listing is generated in some manner, such as from an office visit, telephone call, or inquiry on a web site of a scheduling system. The buyer lead is then communicated to one or more real estate agents using text messages. In order to get the buyer lead, a real estate agent needs to confirm his reception of one such text message and desire to receive the lead. In one example implementation, the first responding real estate agent gets the buyer lead. In this alternate embodiment, receiving the request for the target comprises receiving a buyer lead for a real estate listing, and the target contact comprises a lead recipient. In the embodiments discussed above where the request concerns a showing appointment (e.g., seeking a different time for a given showing appointment, inquiry as to whether a showing is complete, communicating a buyer lead to an agent, etc.), the request provides an example of a "showing request for a real estate listing", regardless of whether the request is initiated by a listing agent, the scheduling system, or some other entity. Moreover, a scheduling or sending system "receiving" a request includes requests generated internally by the system or input by a system operator.

When the sending system receives the request for the target, the sending system oftentimes communicates with a target contact to confirm the request. For example, when a showing agent requests a showing appointment for a listing, the scheduling system 102 contacts a listing contact to confirm the showing appointment. In such a case, the scheduling system 102 accepts or declines the showing appointment request based on a reply to the showing appointment request (for instance in a reply message) from the listing contact. The scheduling system 102 communicates with the listing contact by e-mail, telephone, text messaging (e.g., SMS messaging), etc. In recent years, text messaging has evolved to be a prompt, convenient, and popular means to send notifications and requests. Therefore, many real estate property listing agents and owners opt to use text messaging for showing appointment confirmation.

At 204, the sending system selects a text messaging number from a list of text messaging numbers that it maintains. A text messaging number is a number or code used for sending and receiving text messages. In one embodiment, the text messaging number is a "full" or "normal" telephone number, such that, at 204, the sending system selects a telephone number from a list of telephone numbers that it maintains. A full or normal "telephone number", as the term is used herein, is a string of numerical digits (for example in a format compliant with the E.164 standard) that, if dialed by one device, can be used to connect to another device over a telephone network to exchange voice communications. In one illustrative implementation, the list of telephone numbers comprises fifty telephone numbers, which may be consecutive telephone numbers. Moreover, the scheduling system 102 may prioritize the list of telephone numbers (e.g., the priority descends from the first to the last telephone number on a numerically ordered list of telephone numbers), and select the highest priority available telephone number in the list. In alternative implementations, the text messaging number is a different number or code such as a modified telephone number (e.g., a number generated by adding digits to or extracting digits from a normal telephone number) or a short code, which has fewer digits than a normal telephone number.

Additionally, at 204, the sending system creates a mapping between the request (e.g., a showing appointment request), the selected telephone number, the target (e.g., the listing), and a target contact (e.g., a listing agent). The mapping comprises an end time (e.g., the end time of a showing appointment), and, in an illustrative implementation, the sending system expires the mapping after a fixed amount of time from the end time, wherein the fixed amount of time is configurable as desired for a particular implementation scenario. In one embodiment, the fixed amount of time from the end time is twenty four hours; and the fixed amount of time is set to zero hours in another embodiment. Moreover, in at least one illustrative context, the sending system expires the mapping before the end time, such as when there are no available telephone numbers in the list of telephone numbers to create a mapping for a given request.

At 206, the sending system sends, to the target contact using the selected telephone number, a text message indicating the request for the target. The text message including the request for the target is also referred to herein as a request text message. The selected telephone number is a source or originating number of the text message, while the text message number of the target contact is a destination number of the text message. In the illustrative embodiment of the system 100, the scheduling system 102 sends a text message to the device 108 over the networks 114 and 110 for confirmation of a showing appointment request. Upon receiving the request text message, the listing contact sends, to the scheduling system 102, using the device 108 over the networks 110 and 114, a reply text message. However, unlike e-mail, text messaging technologies do not insert, within the reply text message, the content of the request text message. Accordingly, the reply text message includes text content generated by the target contact, but not content of the request text message. The reply text message also includes a destination number (i.e., the source number of the request text message), and a source number (i.e., the destination number of the request text message).

At 208, the sending system receives the reply message from the target contact using the selected telephone number. In one embodiment, the reply message comprises a reply telephone call made to the selected telephone number by a listing contact using the device 108 over the networks 110 and 114. In another embodiment, the reply message comprises a reply text message sent to the selected telephone number by the listing contact using the device 108 over the networks 110 and 114. Accordingly, it can be said that the reply message comprises one of a reply text message or a reply telephone call made to a selected text messaging number, where the text messaging number comprises a telephone number. At 210, the sending system compares the target contact and the selected telephone number for the reply message to the mapping created at 204. Based on the result of this comparison, the sending system determines that the reply message comprises a reply to the request for the target. In one embodiment, the scheduling system 102 matches a reply text message to a request text message, for instance to confirm a showing appointment, by comparing the destination and source numbers of the reply text message to (contents of) the mapping.

Figure 3:
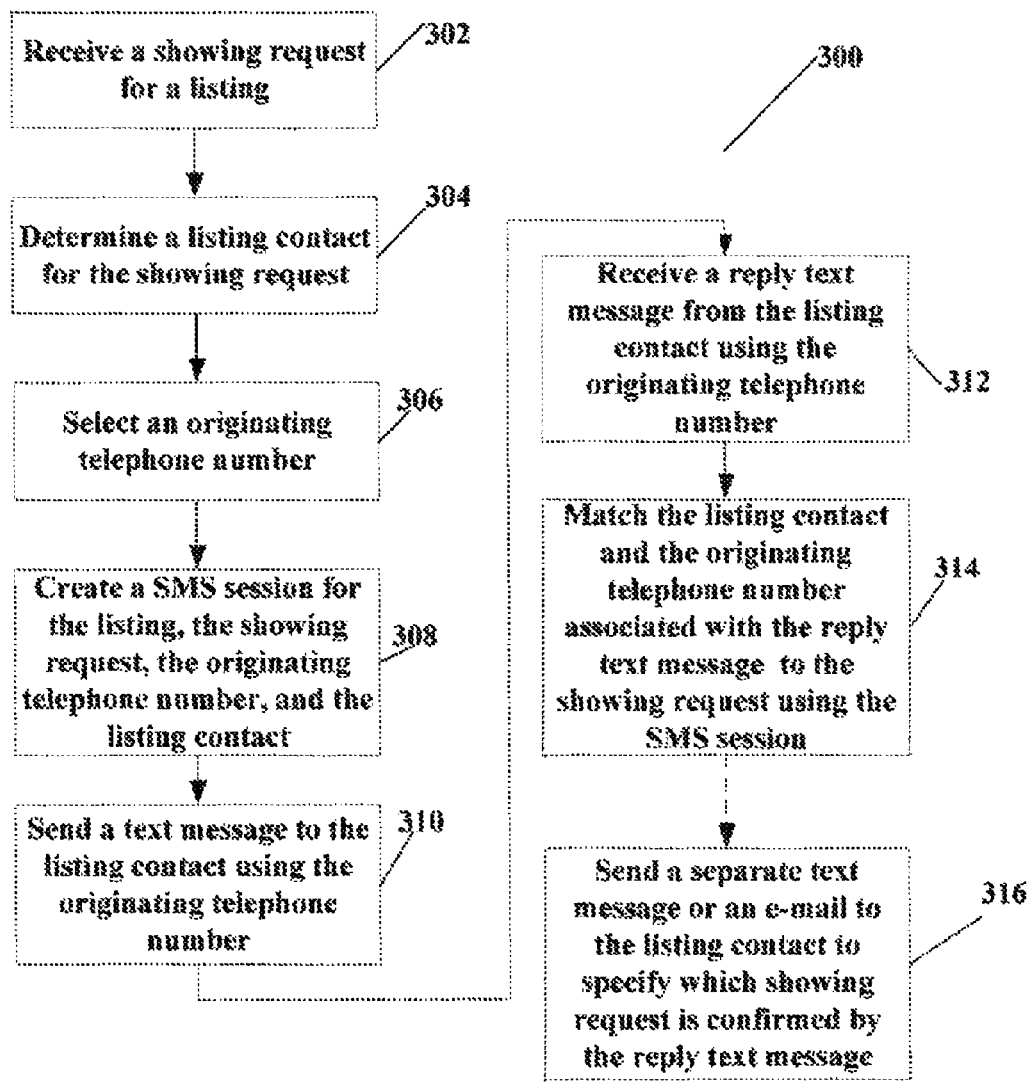
FIG. 3 is a logical flowchart illustrating a method for providing text messaging confirmation in accordance with some embodiments.
Figure 5:
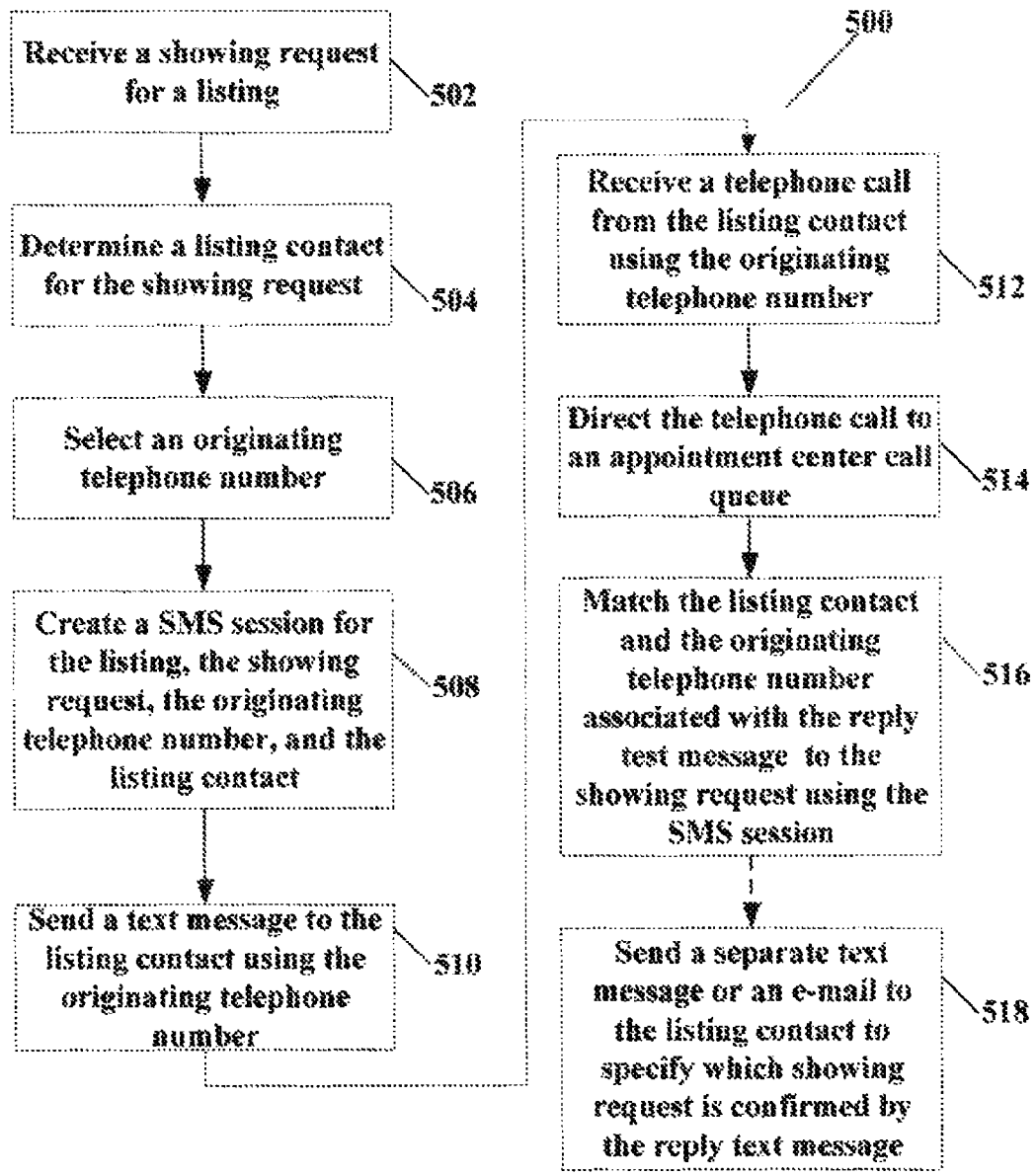
FIG. 5 is a logical flowchart illustrating a method for providing text messaging confirmation in accordance with some embodiments.

Referring now to FIGS. 3 and 5, each shows a logical flowchart illustrating a method for providing text messaging confirmation in accordance with two different embodiments of the present disclosure. Methods 300 and 500 are each performed by the real estate showing appointment scheduling system 102 in this illustrative implementation. However, the methods 300 and 500 are implementable within other systems having infrastructure for sending request text messages and receiving corresponding reply messages. Moreover, in the embodiment described, the text messaging numbers that are used are telephone numbers. However, in alternative embodiments, different numbers or codes can function as text messaging numbers.

Turning first to the method 300, at 302, the scheduling system 102 receives a showing request (i.e., a request for or regarding a showing appointment) for a real estate listing, for instance, when a showing agent accesses the scheduling system 102 and attempts to make a showing appointment on the listing. The showing request generally indicates the listing and a time in the future when the showing agent (or other interested parties, such as an inspector) intends to see the underlying property. Based on the showing request, at 304, the scheduling system 102 determines a listing contact for the real estate listing by examining the listing and its associated settings that are stored in the database 104. For example, a setting indicates that the listing agent prefers to be notified by text messages for showing requests, while another setting indicates the listing agent's mobile telephone number. In the illustrative embodiment, the listing contact has a text messaging number (e.g., a telephone number).

At 306, the scheduling system 102 selects an originating telephone number from a list of telephone numbers for sending a request text message to the listing contact for a showing request confirmation. More generally stated, the scheduling system 102, at 306, selects a text messaging number from a list of text messaging numbers. Selection of the originating telephone number is further illustrated by reference to a method 400 shown as a flowchart in FIG. 4.

Figure 4:
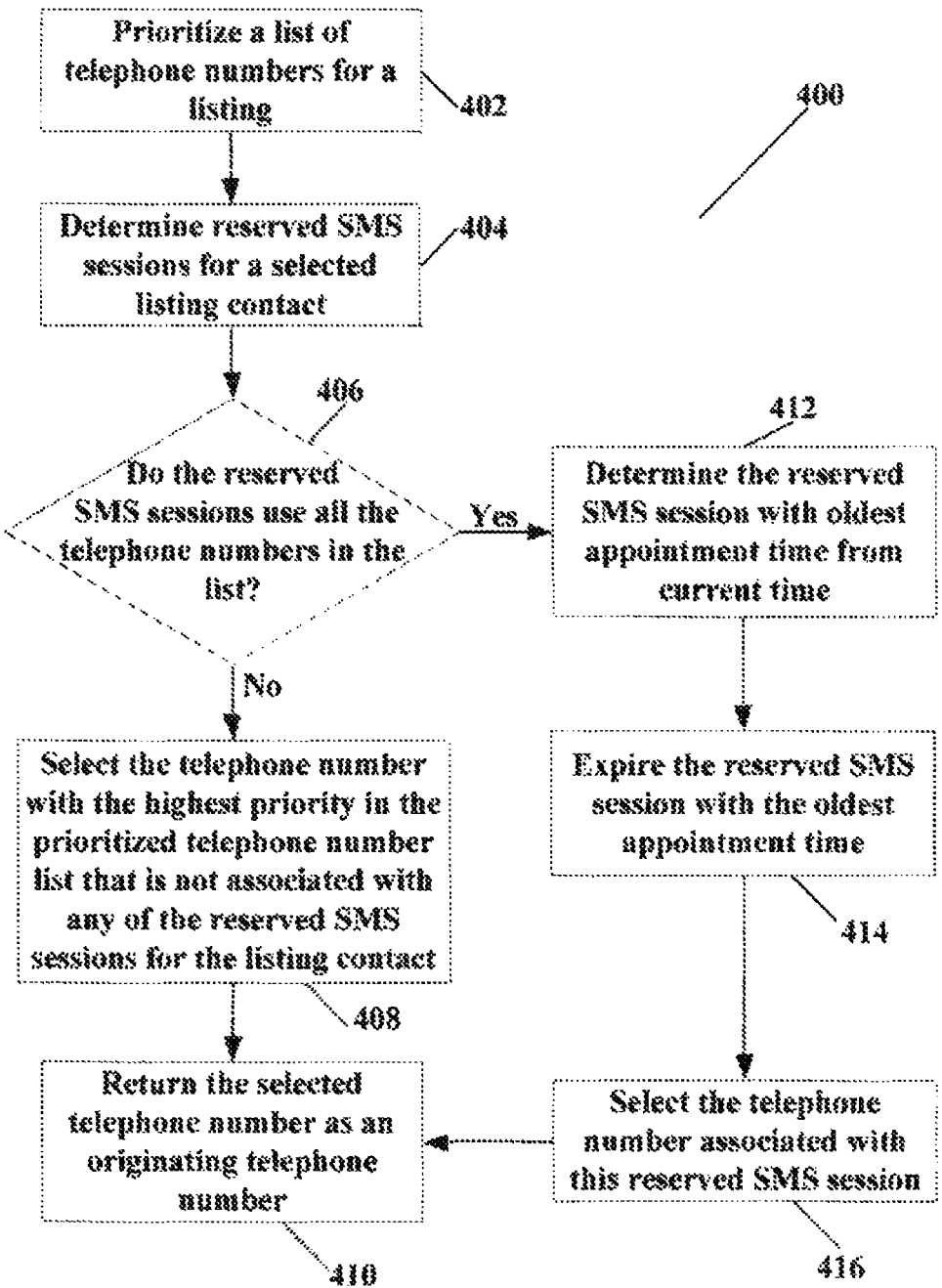
FIG. 4 is a logical flowchart illustrating a method for selecting a telephone number to facilitate providing text messaging confirmation in accordance with some embodiments.

Turning now to FIG. 4, at 402, the scheduling system 102 prioritizes a list of telephone numbers for a listing. As a result of the prioritization, the list of telephone numbers comprises a prioritized list of telephone numbers. In one embodiment, the priorities of the list of telephone numbers descend from the first number in the list to the last number in the list. Furthermore, the order of the telephone numbers in the list is the order of the priorities of the telephone numbers. In another embodiment, the prioritized list of telephone numbers comprises a numerically ordered list of telephone numbers, wherein the priorities descend from the first number on the list to the last number on the list. Any other suitable priority mechanism can be used, such as one based on most used telephone number or least used telephone number for a particular listing or listing agent, for example. One benefit of the prioritization of the list of telephone numbers is that a small set of telephone number are more frequently used than other telephone numbers. Accordingly, the more frequently used telephone numbers become more readily identifiable, and can be added as caller IDs mapping to a name by text message recipients.

At 404, the scheduling system 102 determines, by examining SMS sessions in memory or in the database 104, reserved SMS sessions for a selected listing contact, wherein a SMS session is a specific example of and comprises a logical representation of a mapping for a given showing request, selected text messaging number (e.g., originating telephone number), real estate listing, and listing contact. Accordingly, a mapping is interchangeably referred to herein as a SMS session. Moreover, a SMS session comprises an end time which, for example, is a showing appointment time.

Reserved SMS sessions for a listing contact are defined as SMS sessions that have been created, but have not yet expired, for the listing contact.

The scheduling system 102 performs 404 when it receives a showing request at 302. In one illustrative implementation, the scheduling system 102 processes showing requests one by one. Assuming a given showing request for a particular target (e.g., listing), every other showing request received after that given showing request is termed herein as a subsequent showing request for the particular target.

At 406, the scheduling system 102 checks whether the reserved SMS sessions use all the telephone numbers in the list of telephone numbers. If the reserved SMS sessions do not use all the telephone numbers in the list, there are some telephone numbers in the list that are available for selection. Accordingly, at 408, the scheduling system 102 determines a highest priority available telephone number on the prioritized list of telephone numbers, and selects the highest priority available telephone number. For example, where only the last forty two telephone numbers in a list of fifty telephone numbers are available, and the priorities of the list of telephone number descend from the first to the last telephone numbers, the ninth telephone number in the list will be selected in the list as the highest priority available telephone number. At 410, the scheduling system 102 returns the selected telephone number as an originating telephone number for sending text messages.

Turning back to 406, the scheduling system 102 may determine that the reserved SMS sessions have used all the telephone numbers in the list of telephone numbers. In other words, the scheduling system 102, at 406, determines that there is an absence of available telephone numbers in the list of telephone numbers to select a telephone number. Accordingly, the scheduling system 102 functions pursuant to the "yes" decision branch of 406 to determine an originating telephone number.

At 412, the scheduling system 102 determines the reserved SMS session that has an oldest appointment time from a current time. As used herein, the oldest appointment time from the current time is a showing appointment time, among the showing appointment times of all the reserved SMS sessions for the selected listing contact, which is farthest in the future from the current time. A more general term for the oldest appointment time is an oldest request time. At 414, the scheduling system 102 expires the reserved SMS session with the oldest appointment time. In other words, the reserved SMS session with the oldest appointment time is terminated and resources, such as the selected telephone number, associated with this reserved SMS session are made available. At 416, the released telephone number is selected, and at 410, the scheduling system 102 returns the selected telephone number as an originating telephone number for sending text messages.

Accordingly, in general, it can be said that, at 412, the scheduling system 102 determines that the mapping has an oldest request time and selects (416) the telephone number of the mapping. Additionally, at 414, the mapping is expired before the end time and a new mapping is created between the subsequent request (received at 302), the selected telephone number, the target (meaning the listing), and the target contact (meaning the listing contact).

Turning back now to FIG. 3, at 308, the scheduling system 102 creates a SMS session (representing a mapping) for the showing request, the listing, the selected originating telephone number, and the listing contact. In the illustrative embodiment, the end time of the SMS session and mapping is the end time of the showing appointment request. Additionally, the scheduling system 102 automatically expires the SMS session and mapping after a fixed amount of time (such as zero hours or twenty four hours) from the end time of the SMS session. At 310, the scheduling system 102 sends a text message to the listing contact using the selected originating telephone number, requesting confirmation of the showing appointment request.

Figure 6:
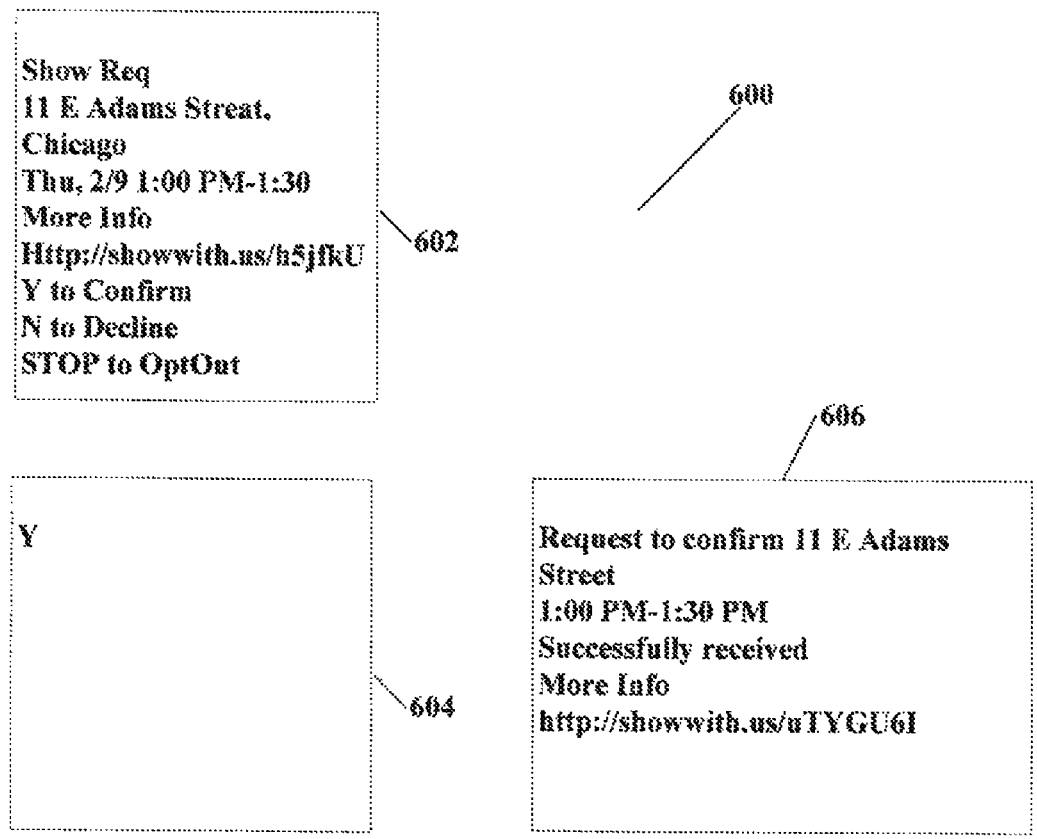
FIG. 6 is a text message content layout diagram illustrating a request text message and a reply text message in accordance with some embodiments.

An example text message requesting confirmation of a showing appointment request is illustrated by reference to a text message 602 shown in FIG. 6. The text message 602 includes information or content such as the type of the text message (e.g., a showing request), address of the listing, and time of the showing appointment. The text message 602 further indicates to the listing contact that he should reply with the letter "Y" to confirm or accept the showing request, and reply with the letter "N" to decline the showing request.

Responsive to the request text message, the listing contact sends the scheduling system 102 a reply text message. Accordingly, the scheduling system 102, at 312, receives the reply text message using the originating telephone number. Thus, in this example implementation, the scheduling system 102, at 312, receives a reply message that comprises a reply text message. An example reply text message to a showing request text message is illustrated by reference to a text message 604 shown in FIG. 6. In this example reply text message, the listing contact accepts and confirms the showing request, indicated by the request text message 602, by typing the letter "Y" in the text message body. Alternatively, the listing contact can decline the showing request by typing the letter "N" in the text message body. In a further implementation of the present teachings, the listing contact may ask to reschedule the showing request to a different time by typing the letter "R" in the text message body of 604.

At 314, the scheduling system 102 matches the source number of the reply text message to the listing contact. Additionally, at 314, the scheduling system 102 matches, using the SMS session created at 308, the listing contact and the originating telephone number to the showing request. Furthermore, at 314, the scheduling system 102 determines a type of the reply message based on the content of the reply message. For example, the type of reply text message 604, is a reply message confirming and accepting the showing appointment request (e.g., an appointment confirmation and acceptance text message), a reply message denying the showing appointment request (e.g., an appointment denial text message), or a text message suggesting an alternative appointment showing time (e.g., an appointment modification text message).

Based on the example reply text message 604, at 314, the scheduling system 102 determines that the reply message confirms the showing request for the target (which in this illustration is the listing contact), and, as such, determines that the type of the reply message is a confirmation and acceptance of the showing request for the listing contact. Stated another way, the scheduling system 102 determines, based on content of the reply message, that the reply message comprises a confirmation of the showing request for the real estate listing. In accordance with an optional embodiment, at 316, the scheduling system 102 sends an e-mail to the listing contact to specify which showing request is confirmed by the reply text message.

Alternatively, the scheduling system 102, at 316, sends a voice message (e.g., a prerecorded voice message), a different text message to the listing contact, or a telephone call (e.g., between a system operator and the listing contact) to specify which showing request is confirmed by the reply text message. An example text message indicating that the showing request is confirmed by the reply text message is illustrated by reference to a text message 606. The text message 606 includes information or content such as the type of the text message (e.g., an indication of confirmation of a showing request), address of the listing, status of the confirmation of the showing request, and time of the showing appointment. Furthermore, the text message 606 indicates to the listing contact additional information about the confirmation. Accordingly, it can be said that the scheduling system 102 sends at least one of an e-mail, a voice message, a telephone call, or a separate text message to the target (the listing contact) indicating that the request (the showing request) for the target (the real estate listing) is confirmed.

Turning now to FIG. 5, the functionality performed by the appointment scheduling system 102 at 502 to 510 is substantially the same as the functionality performed by the appointment scheduling system at 302 to 310. Therefore, the detail of such functionality is not repeated here for the sake of brevity. However, a brief description of the functionality at 502 to 510 is provided for completeness. Accordingly, at 502, the scheduling system 102 receives a showing request for a listing. The scheduling system 102, at 504, determines a listing contact (e.g., listing agent or owner) for the showing request. At 506, the scheduling system 102 selects an originating telephone number for sending a text message. Selection of the originating telephone number is further illustrated by reference to FIG. 4, for instance. The scheduling system 102, at 508, creates a SMS session for the listing, the showing request, the originating telephone number, and the listing contact. Using the originating telephone number, the scheduling system 102, at 510, sends a text message (e.g., the text message 602) to the listing contact.

In response to the text message, in this particular embodiment, instead of sending a reply text message (as illustrated by reference to FIG. 3) the listing contact calls the originating telephone number to accept or decline the showing request. At 512, the scheduling system 102 receives this telephone call from the listing contact using the originating telephone number. Accordingly, it can be said that the scheduling system 102, at 512, receives a reply message, and the reply message comprises a reply telephone call made to the selected telephone number. At 514, the scheduling system 102 directs the telephone call to an appointment center call queue.

An appointment center is a call center where receptionists or operators receive and respond to telephone calls. Before a telephone call is handled, it is put into a call queue. Generally, the call queue is a list of unhandled telephone calls which are handled in order they are received. An operator at the appointment center may manually match the reply message to the showing request. Therefore, it can be said that the call center determines that the reply message (the telephone call) comprises the reply to the request (the request text message) for the target listing contact. Alternatively, an operator accesses the scheduling system 102 to perform such matching. Accordingly, at 516, the scheduling system 102 matches the listing contact and the originating telephone number associated with the reply message to the showing request using the SMS session created at 508. In accordance with an optional embodiment, at 518, the scheduling system 102 sends an e-mail to the listing contact to specify which showing request is confirmed by the telephone call. Alternatively, the scheduling system 102, at 518, sends a voice message, a telephone call, or a different text message to the listing contact to specify which showing request is confirmed by the telephone call.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method for providing confirmation of a request for a target communicated using text messaging as described herein. The non-processor circuits may include, but are not limited to, a radio receiver, a radio transmitter, signal drivers, clock circuits, power source circuits, and user input devices. As such, these functions may be interpreted as steps of a method to perform the providing confirmation of a request for a target communicated using text messaging described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a non-transient computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing confirmation of a request for a target communicated using text messaging, the method comprising:
    receiving, by a sending system, a request for a target;
    selecting, by the sending system, a telephone number from a list of telephone numbers, wherein a mapping is created between the request, the selected telephone number, the target, and a target contact;
    sending, by the sending system to the target contact using the selected telephone number, a text message indicating the request for the target;
    receiving a reply message from the target contact using the selected telephone number; and
    determining that the reply message comprises a reply to the request for the target by comparing the target contact and the selected telephone number for the reply message to the mapping.

2. The method of claim 1, wherein receiving the request for the target comprises receiving a showing request for a real estate listing, and the target contact comprises a listing contact.

3. The method of claim 1, wherein receiving the request for the target comprises receiving a buyer lead for a real estate listing, and the target contact comprises a buyer lead recipient.

4. The method of claim 1, wherein the request for the target comprises an offer or a request for a different time for a showing of a real estate listing.

5. The method of claim 1 further comprising determining a type of the reply message based on content of the reply message.

6. The method of claim 5 further comprising determining that the type of the reply message is a confirmation of the request for the target.

7. The method of claim 6, wherein the request for the target comprises an inquiry for a status of a showing of a real estate listing.

8. The method of claim 6 further comprising sending at least one of an e-mail, a voice message, a telephone call, or a separate text message to the target contact indicating that the request for the target is confirmed.

9. The method of claim 1, wherein the reply message comprises a reply text message.

10. The method of claim 1, wherein the reply message comprises a reply telephone call made to the selected telephone number.

11. The method of claim 10 further comprising directing the telephone call to a call center, wherein the call center determines that the reply message comprises the reply to the request for the target.

12. The method of claim 1, wherein the list of telephone numbers comprises a prioritized list of telephone numbers; and selecting the telephone number comprises determining a highest priority available telephone number on the prioritized list of telephone numbers.

13. The method of claim 12, wherein the prioritized list of telephone numbers comprises a numerically ordered list of telephone numbers.

14. The method of claim 1, wherein the mapping comprises an end time, and the method further comprising expiring the mapping after a fixed amount of time from the end time.

15. The method of claim 1, wherein the mapping comprises an end time, and the method further comprising expiring the mapping before the end time.

16. The method of claim 15 further comprising:
    receiving a subsequent request for the target;
    determining that there is an absence of available telephone numbers in the list of telephone numbers to select a telephone number;
    determining that the mapping has an oldest request time, and selecting the telephone number of the mapping, wherein the mapping is expired before the end time and a new mapping is created between the subsequent request, the selected telephone number, the target, and the target contact; and
    sending, to the target contact using the selected telephone number, a text message indicating the subsequent request for the target.

17. A method for providing confirmation of a showing request communicated using text messaging, the method comprising:
    receiving, by a real estate showing appointment scheduling system, a showing request for a real estate listing;
    determining, by the real estate showing appointment scheduling system, a listing contact for the real estate listing;
    selecting, by the real estate showing appointment scheduling system, a text messaging number from a list of text messaging numbers, wherein a mapping is created between the showing request, the selected text messaging number, the real estate listing, and the listing contact;
    sending, by the real estate showing appointment scheduling system to the listing contact using the selected text messaging number, a text message indicating the showing request;
    receiving a reply message from the listing contact using the selected text messaging number; and comparing the listing contact and the selected text messaging number for the reply message to the mapping to match the reply message to the showing request for the real estate listing.

18. The method of claim 17, wherein the reply message comprises one of a reply text message or a reply telephone call made to the selected text messaging number.

19. The method of claim 18, wherein the text messaging number comprises a telephone number.

20. The method of claim 17 further comprising determining, based on content of the reply message, that the reply message comprises a confirmation of the showing request for the real estate listing.

21. The method of claim 20 further comprising sending at least one of an e-mail, a voice message, a telephone call, or a separate text message to the listing contact indicating the confirmation of the showing request for the real estate listing.

22. The method of claim 17 further comprising:
determining that there is a lack of available text messaging numbers in the list of text messaging numbers;
determining a mapping having an oldest appointment time, wherein selecting the text messaging number comprises selecting a text messaging number associated with the mapping having the oldest appointment time; and
expiring the mapping having the oldest appointment time prior to an end time.

23. The method of claim 17, wherein the list of text messaging numbers comprises a prioritized list of text messaging numbers, and selecting the text messaging number comprises determining a highest priority available text messaging number on the prioritized list of text messaging numbers.

* * * * *